United States Patent
Nally et al.

(10) Patent No.: US 9,443,139 B1
(45) Date of Patent: Sep. 13, 2016

(54) METHODS AND APPARATUS FOR IDENTIFYING LABELS AND/OR INFORMATION ASSOCIATED WITH A LABEL AND/OR USING IDENTIFIED INFORMATION

(71) Applicant: ACCUSOFT CORPORATION, Tampa, FL (US)

(72) Inventors: Robert M Nally, Lakeland, FL (US); Edward R Krajcik, Safety Harbor, FL (US); Jeffrey M Hodges, Tampa, FL (US)

(73) Assignee: ACCUSOFT CORPORATION, Tampa, FL (US)

( * ) Notice: Subject to any disclaimer, the term of this patent is extended or adjusted under 35 U.S.C. 154(b) by 62 days.

(21) Appl. No.: 14/587,858

(22) Filed: Dec. 31, 2014

Related U.S. Application Data

(60) Provisional application No. 62/086,147, filed on Dec. 1, 2014.

(51) Int. Cl.
  *G06K 9/00* (2006.01)
  *G06K 9/18* (2006.01)

(52) U.S. Cl.
  CPC ............. *G06K 9/00469* (2013.01); *G06K 9/18* (2013.01)

(58) Field of Classification Search
  CPC ....................... G06K 2209/01; G06K 9/00469
  USPC ......................................................... 382/182
  See application file for complete search history.

(56) References Cited

U.S. PATENT DOCUMENTS

| | | | | |
|---|---|---|---|---|
| 6,738,518 B1* | 5/2004 | Minka | ....................... | G06K 9/72 382/194 |
| 8,527,522 B2* | 9/2013 | Baron | ................... | G06F 17/278 707/749 |
| 2007/0053610 A1* | 3/2007 | Bannai | ................. | G06K 9/3233 382/291 |

* cited by examiner

*Primary Examiner* — Stephen R Koziol
*Assistant Examiner* — Shaghayegh Azima
(74) *Attorney, Agent, or Firm* — Straub & Pokotylo; Michael P. Straub; Ronald P. Straub

(57) ABSTRACT

Methods and apparatus for detecting labels included in a document or other binarized image, and for extracting and/or using information associated with a label, are described. A nodal structure modeling objects, e.g., characters, character strings or words, which make up various label aliases are described. The nodal structure is used to generate a score for portions of a binarized document with the scores being used to determine the presence or absence of one or more label aliases. When a label alias is determined to be present, information is extracted from the document and used as information corresponding to a label to which the identified label alias corresponds. Multiple different label aliases may correspond to a single label allowing multiple different aliases to be used to identify the same information. The label aliases and information extraction can be and sometimes used to extract information from scanned forms.

19 Claims, 12 Drawing Sheets

100

| COMPANY: A&K ENERGY CONSERVATION INC. | | | | INVOICE | IN0012504 | |
|---|---|---|---|---|---|---|

15552 US-301
DADE CITY, FL, 33523
USA
PHONE: (352)-567-1999
FAX: (352)-567-1947

INVOICE DATE 4/26/2013
JOB: HC20-3300001

SHIP TO:
SOUTHSHORE REGIONAL LIBRARY
CIP # M14021
15816 BETH SHEILDS WAY
RUSKIN, FL 33573

SOLD TO:
HILLSBOROUGH COUNTY
REAL ESTATE DEPT R3M
PO BOX 1110
TAMPA, FL 33601-1110

106

RETROFIT 102  104

| WORK ORDER NO. | SERVICE DATE | CUSTOMER NO. | SALESPERSON | PO NUMBER | SHIP VIA | TERMS |
|---|---|---|---|---|---|---|
| FSLSR-2013002R-1 | APR 26, 2013 | HC | 540 | DPFS-13012036 | RETRO | NET 30 FC 1.5% / MIN $5.00 |

| QUANTITY SUPPLIED | ITEM NUMBER | DESCRIPTION | UNIT PRICE | UOM | TAX | EXTENDED PRICE |
|---|---|---|---|---|---|---|
| 1.00 | LABOR L187LT | CHANGE ORDER #1 | 568.28000 | EACH | N | 2,568.28 |
| 1.00 | L187LT | CONTRACT PRICE | 060.33000 | EACH | N | 10,060.33 |
| | | LABOR TOTAL: | | | | 12,628.61 |

COMMENTS:
LABOR: 12,628.61
LAMPS: 0.00
MATERIALS: 0.00
TRIP CHARGES: 0.00

| SUBTOTAL | 12,628.51 |
|---|---|
| TOTAL SALES TAX | 0.00 |
| TOTAL AMOUNT | 12,628.61 |
| AMOUNT DUE | 12,628.61 |

FIG. 1

| LABEL | LABEL ALIASES | INFORMATION LOCATION |
|---|---|---|
| FIRST LABEL, E.G., SELLER | ALIAS 1, E.G., COMPANY | TO THE RIGHT OF ALIAS |
| | ALIAS 2, E.G., COMPANY NAME | BELOW ALIAS |
| | ALIAS 3, E.G., SELLER | ABOVE ALIAS |
| | ⋮ ALIAS K, E.G., SUPPLIER | TO THE RIGHT OF ALIAS |
| SECOND LABEL, E.G., PURCHASER | ALIAS 1, E.G., SOLD TO | BELOW ALIAS |
| | ALIAS 2, E.G., CONSUMER | TO THE RIGHT OF ALIAS |
| | ALIAS 3, E.G., BUYER | TO THE RIGHT OF ALIAS |
| | ⋮ ALIAS M, E.G., CONSUMER NAME | ABOVE ALIAS |
| ⋮ | ⋮ | ⋮ |
| N<sup>TH</sup> LABEL, E.G., INVOICE NUMBER | ALIAS 1, E.G., INVOICE | ABOVE ALIAS |
| | ALIAS 2, E.G., INVOICE # | BELOW ALIAS |
| | ALIAS 3, E.G., INV NO. | TO THE RIGHT OF ALIAS |
| | ⋮ ALIAS X, E.G., INV | BELOW ALIAS |

FIG. 7

METHODS AND APPARATUS FOR IDENTIFYING LABELS AND/OR INFORMATION ASSOCIATED WITH A LABEL AND/OR USING IDENTIFIED INFORMATION

RELATED APPLICATIONS

The present application claims the benefit of the filing date of U.S. Provisional Application Ser. No. 62/086,147, filed on Dec. 1, 2014 which is hereby expressly incorporated by reference in its entirety.

FIELD OF THE INVENTION

Various embodiments relate to image processing, and more particularly to methods and apparatus for detecting labels included in a document or other binarized image, and for extracting and/or using information associated with a label, are described.

BACKGROUND OF THE INVENTION

Image binarization refers to the process of converting an image represented by pixel values which may assume multiple levels to pixel values which can be one of two values, e.g., a first value corresponding to foreground and a second value corresponding to background. Image binarization can be used to convert a grayscale or a color image to a black and white image. Frequently, binarization is used as the pre-processing step of document image processing. For example optical character recognition (OCR) algorithms may involve image binarization as a first step.

In order to obtain and use information included in binarized images, e.g., documents or pages of a document, the presence or absence of information of interest often needs to be determined along with the location of the information of interest so that the information of interest can be extracted from the image, e.g., document.

For example, it may be desirable to identify the presence and location of a customers name on a binarized form so that the name can be extracted and used to populate a data base, complete a customer record or for some other purpose such as providing a service to the customer.

While identification of a label associated with information of interest may facilitate detection of the information of interest, multiple different terms or phrases may be used for the same information even on the same form. The issue of determining the location of information of interest is not only complicated by the possible use of different terms or phrases possibly being used to identify information of interest but also the possibility that as part of a scanning and binarization process some of the information included in an original hard copy may have been lost or corrupted in generating the digital binarized image representing the document which is to be searched for particular information of interest and then processed with regard to extracting information of interest when its presence is determined.

In view of the above discussion, it should be appreciated that there is a need to address the technical issue of how to determine the presence of information of interest in a document where at least some of the information used to identify the information of interest may be missing or corrupted or where multiple different terms or phrases may be used to identify the same type of information.

SUMMARY OF THE INVENTION

Features relate to identifying information of interest in a binarized document, e.g., a scanned document which may be one or more pages in length, which may include scanning errors and/or other errors which may result in missing or corrupted information in the binarized document being processed. In various embodiments the binarized, e.g., image, version of the document is subjected to an optical character recognition (OCR) operation and the strings of characters produced by the OCR operation are processed further.

In various embodiments a document is checked for the presence of one or more labels and/or label aliases associated with labels corresponding to information of interest. Given that a label alias may not appear as expected due to the scanning/binarization and/or OCR operations and errors potentially associated therewith, a recognition method based on probabilities is used to identify labels in the document. In this manner, the presence of labels and/or label aliases of interest can be detected. The label detection technique is based on expected sequences of objects, e.g., character strings, corresponding to labels.

Multiple label aliases can correspond to the same information. For this reason in some embodiments multiple label aliases corresponding to the same information are grouped and associated with a label. A label corresponding to which information of interest is sought from one or more documents may appear as one of many different label aliases associated with the label. The label serves as a single identifier for the set of label aliases which can be used to identify the same information, e.g., the information corresponding to the label.

Expected relationships between objects are taken into consideration when attempting to determine the presence of a label alias corresponding to a label. An object may, and in some embodiments is, a single word. Expected relationships between objects are modeled as links between objects in a nodal structure which is intended to reflect the probability and sequence in which words and/or other character strings are likely to appear in a document. The objects and labels form what may be described as a nodal structure. The order of nodes, e.g., objects, in the nodal structure along with link weights can be used to generate a score for a portion of a document with regard to a label alias of interest. The score for a label alias reflects the probability that a match between one or more detected objects in a portion of a document being examined and a label alias exists.

While in some embodiments a score corresponding to a label alias is limited to a limited number of values, e.g., a value indicating detection of the alias or an indication that the label alias to which a score corresponds has not been detected, in other embodiments links between nodes may assume a range of weights allowing for scores corresponding to label aliases to assume a wide range of values. In such embodiments some errors in a match may result in a non-perfect match score but a score sufficiently high, e.g., over a predetermined score threshold, that the score is interpreted as indicating detection of the corresponding label alias. In one such embodiment a score below the detection threshold is interpreted as indicating a failure to detect the label alias corresponding to the generated score.

As noted above in various embodiments a label is established for label aliases which correspond to the same information item such as a name, address, post office box, location, etc. Label aliases which normally correspond to the label are modeled as linked nodes based on the objects which form the label aliases and their expected sequence. The links may be weighted based on probability with the overall probability of a detected sequence matching a label or label alias being based on objects detected in a document and their ordering as compared to the expected ordering indicated by the linked nodes of the model used to predict the expected ordering of objects in a document which may include the label alias.

A missing object, e.g., word or character string, is not fatal in terms of recognition of a label in at least some cases since the links of the nodal structure used to determine a score corresponding to a label allow for the possibility of a missing object, e.g., word, in a document which may occur, e.g., due to a scanning error or for another reason.

In addition to modeling the expected sequence of objects corresponding to a label, in various embodiments negative links may be associated with objects that are likely to be detected and may lead to a false label recognition outcome.

Once a label alias is identified in a document, the corresponding information is extracted from the document. For example name information next to a name label alias may be extracted and placed in a field of a form or customer record where customer name information is to be stored.

In some embodiments a list of label aliases corresponding to a label is generated by identifying different label aliases used to identify the same piece of information in a document or set of documents. Such a list may be generated from a set of exemplary documents which are the same or similar to documents which are likely to be scanned and processed by a system implementing the methods described herein.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION

FIG. 1 illustrates an exemplary document which can be processed in accordance with the invention to obtain information of interest.

Figure 6A:
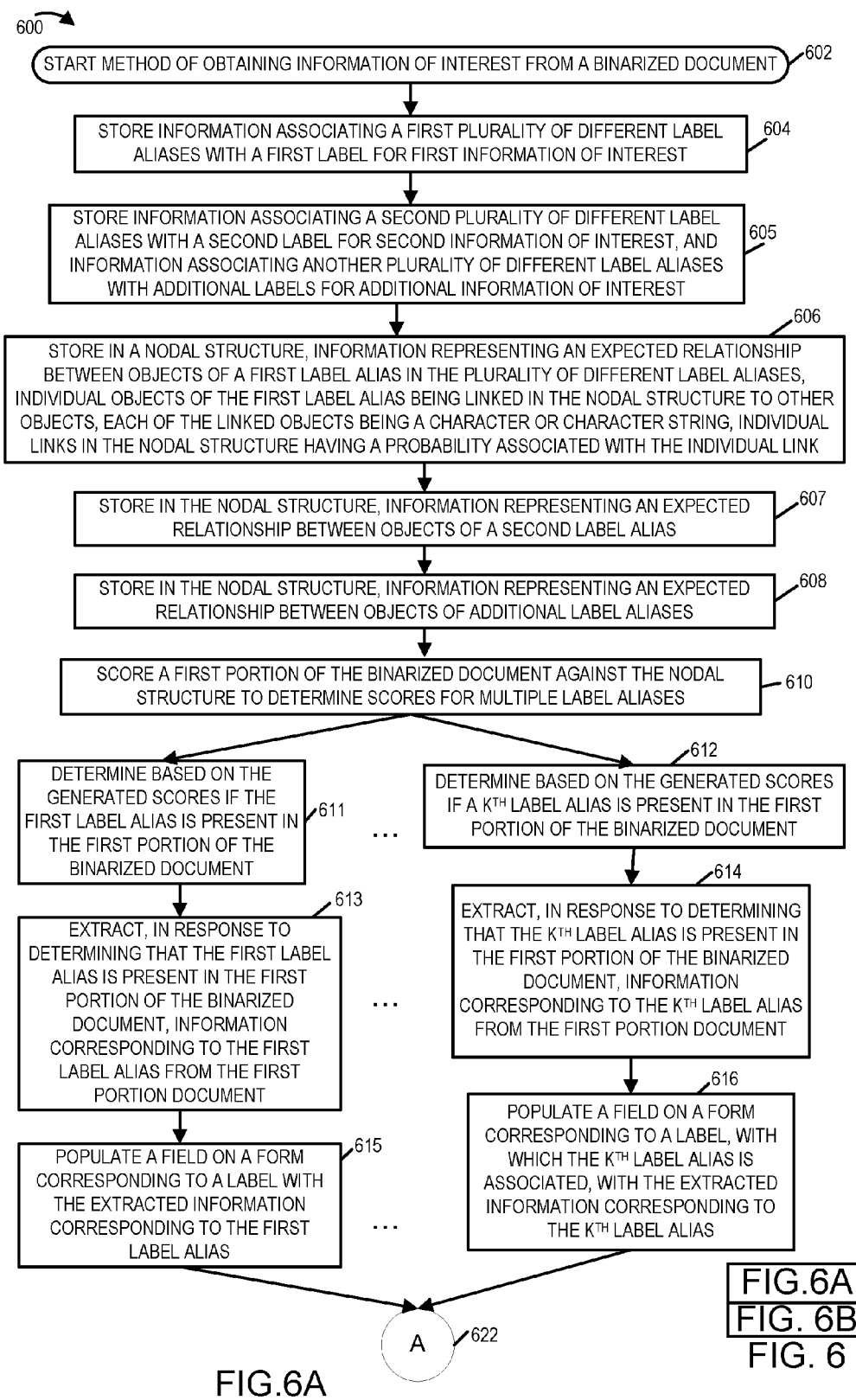
Figure 6B:
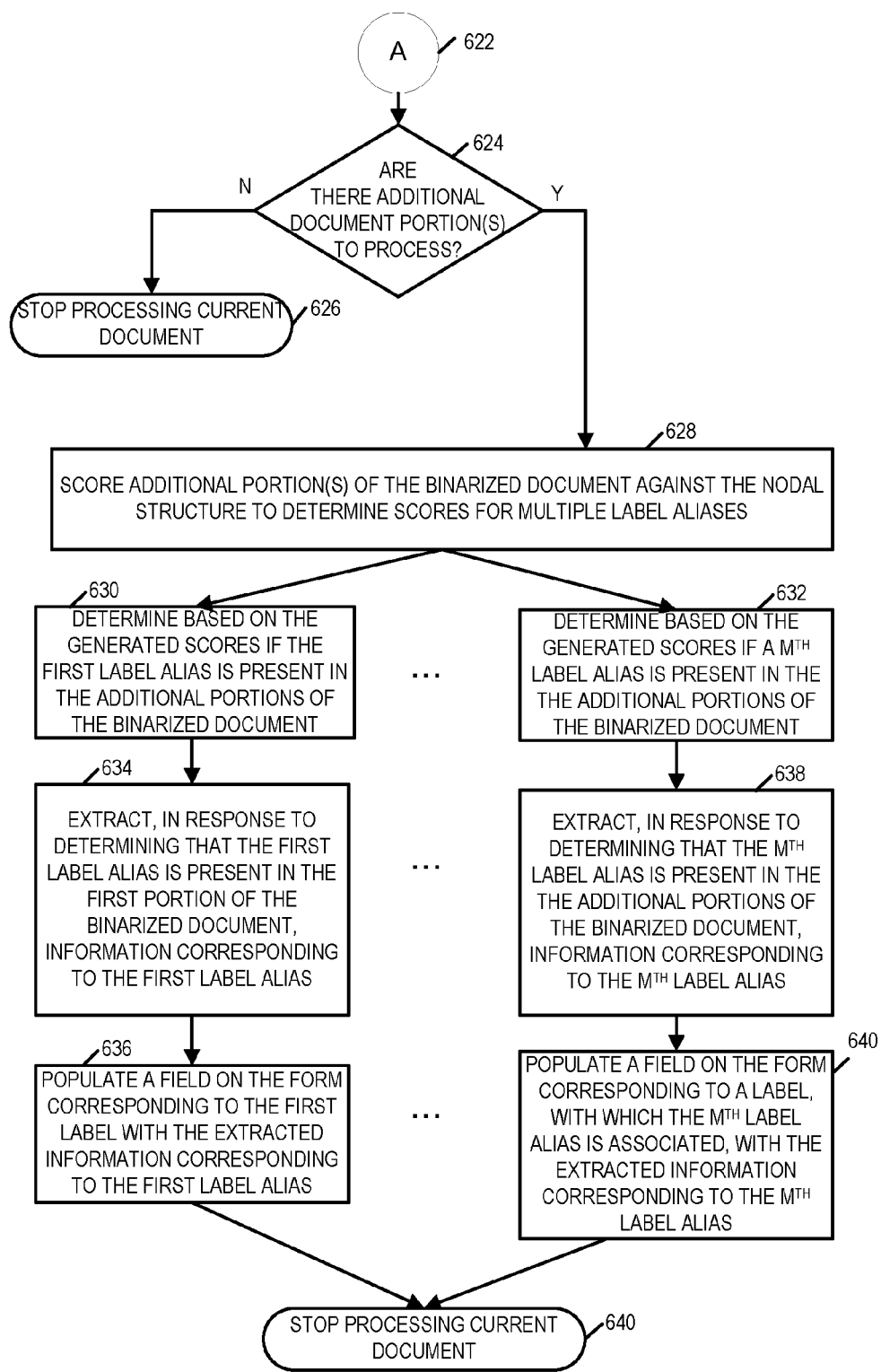

FIG. 6, which comprises the combination of FIG. 6A and FIG. 6B, is a flowchart illustrating an exemplary method of obtaining information of interest from a document, e.g., binarized document, in accordance with one embodiment.

FIG. 7 illustrates an exemplary set of information including a plurality of labels corresponding to information of interest, label aliases associated with each of the labels and a corresponding location of the information of interest relative to the location of each label alias.

Figure 2:
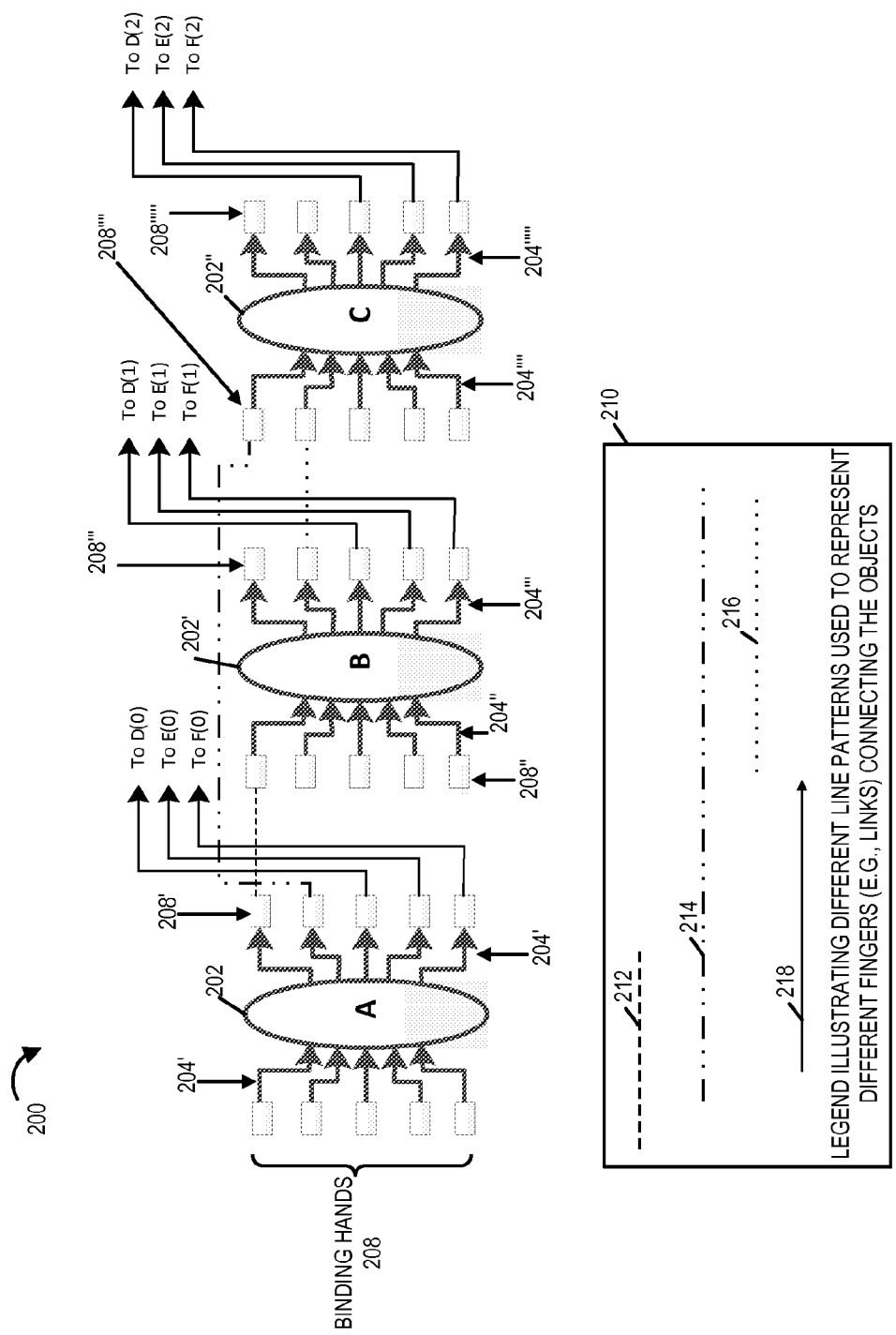
FIG. 2 is a drawing illustrating an exemplary nodal structure, e.g., a Spider Matrix.
Figure 8:
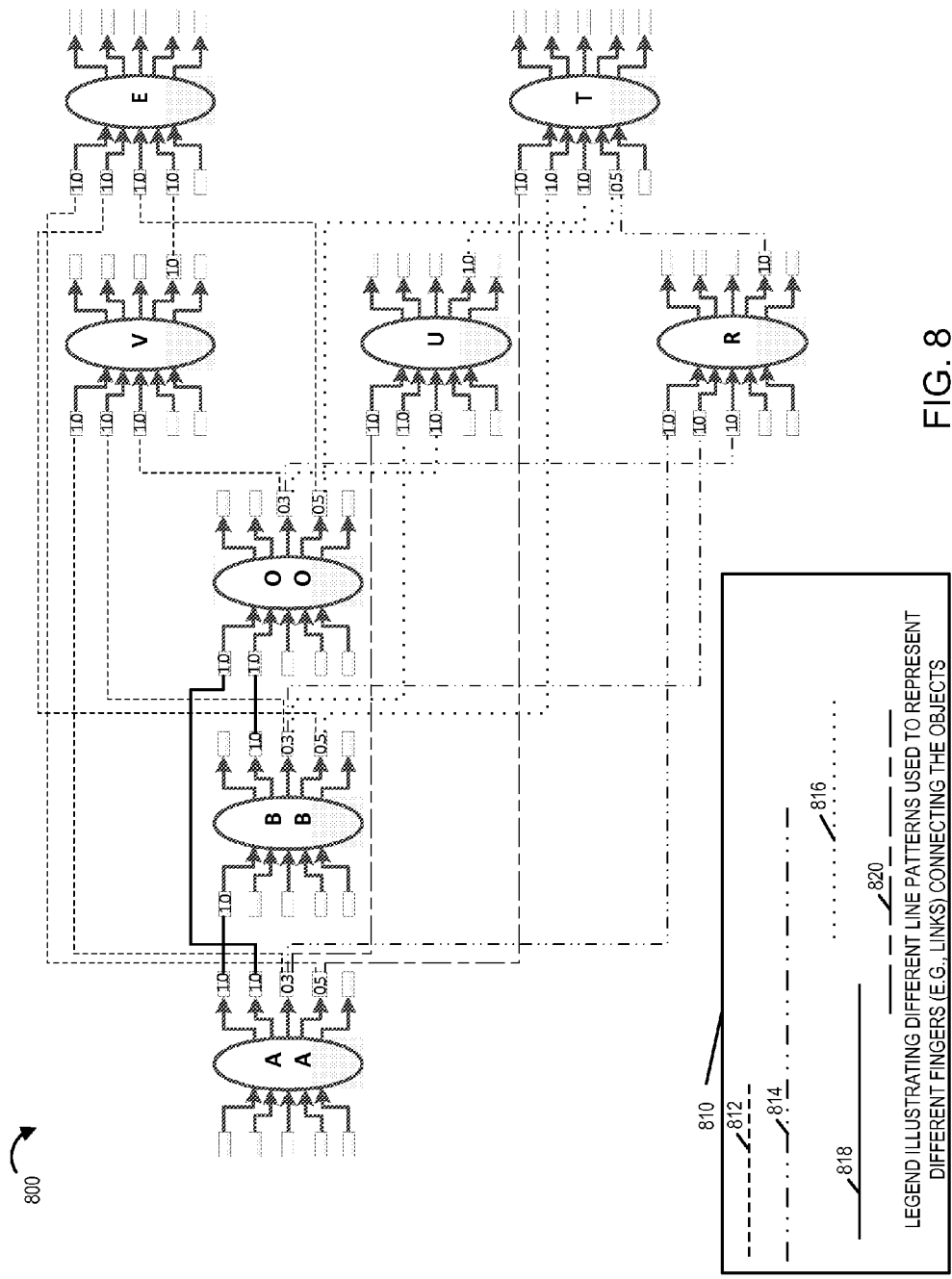

FIG. 8 is a drawing illustrating another exemplary nodal structure, e.g., spider matrix, which is more complex than that shown in FIG. 2.

Figure 9:
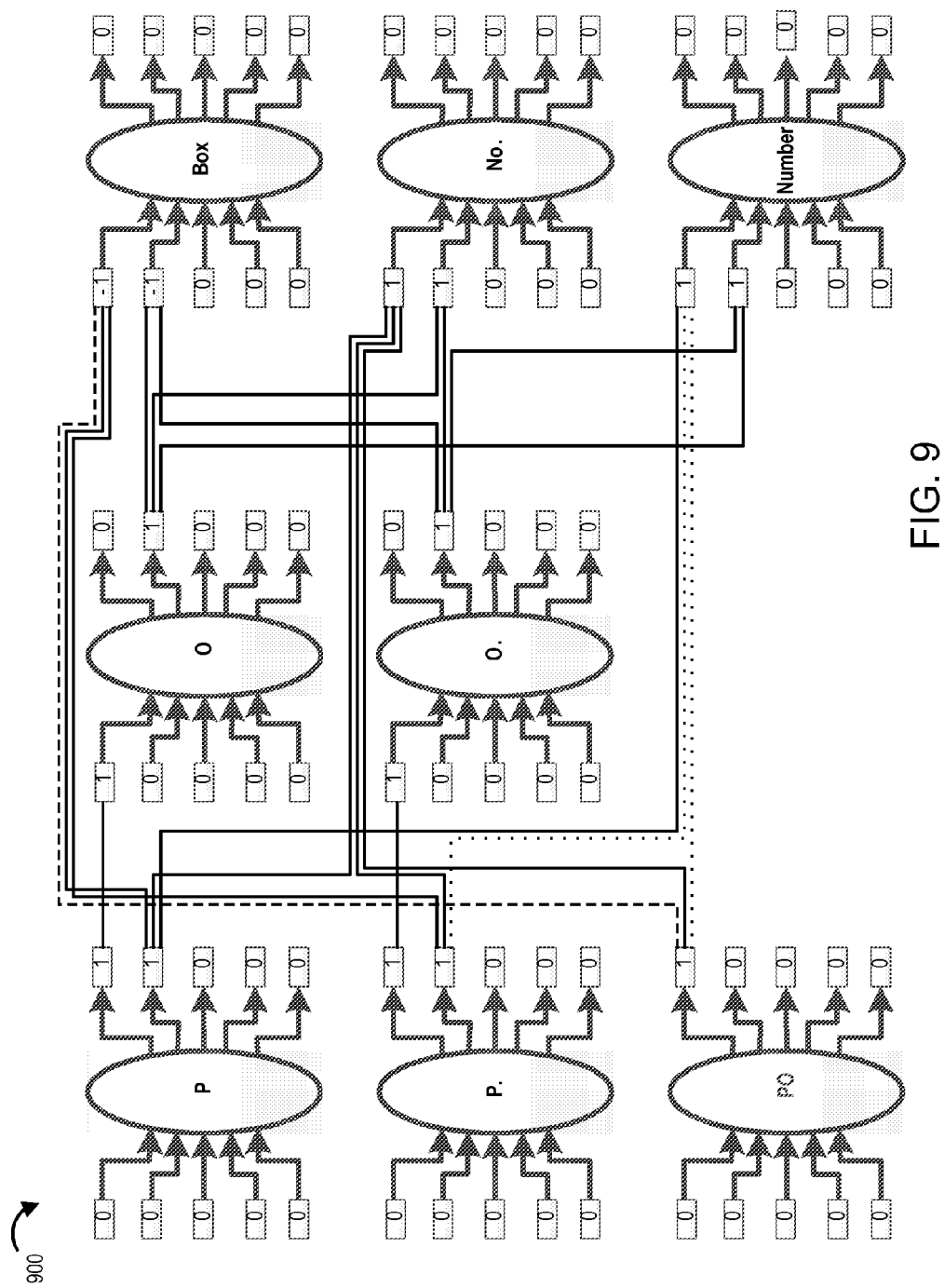

FIG. 9 illustrates an exemplary nodal structure, e.g., spider matrix.

Figure 10:
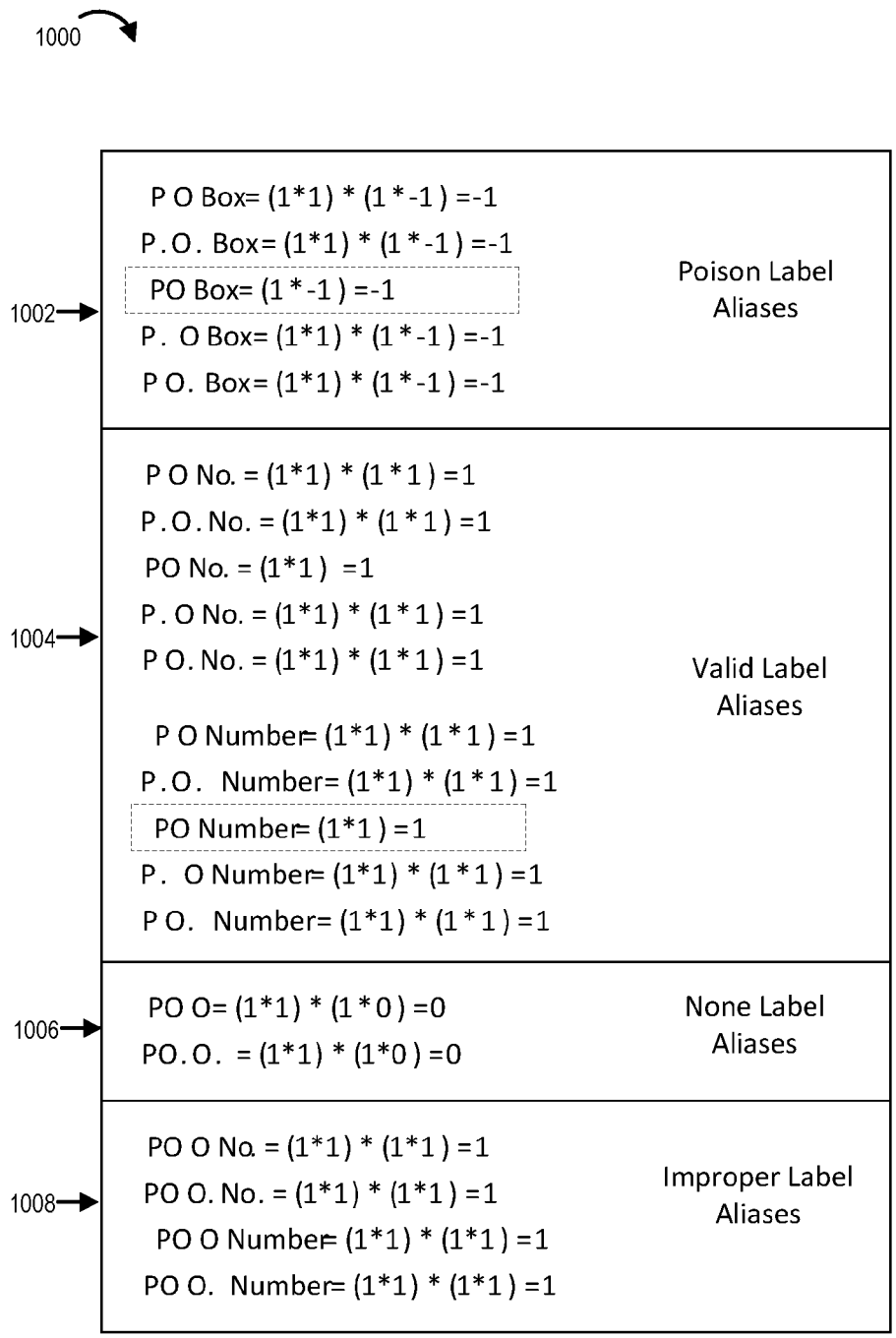

FIG. 10 illustrates scores for various phrases that can be generated based on the matrix of FIG. 9.

Figure 11:
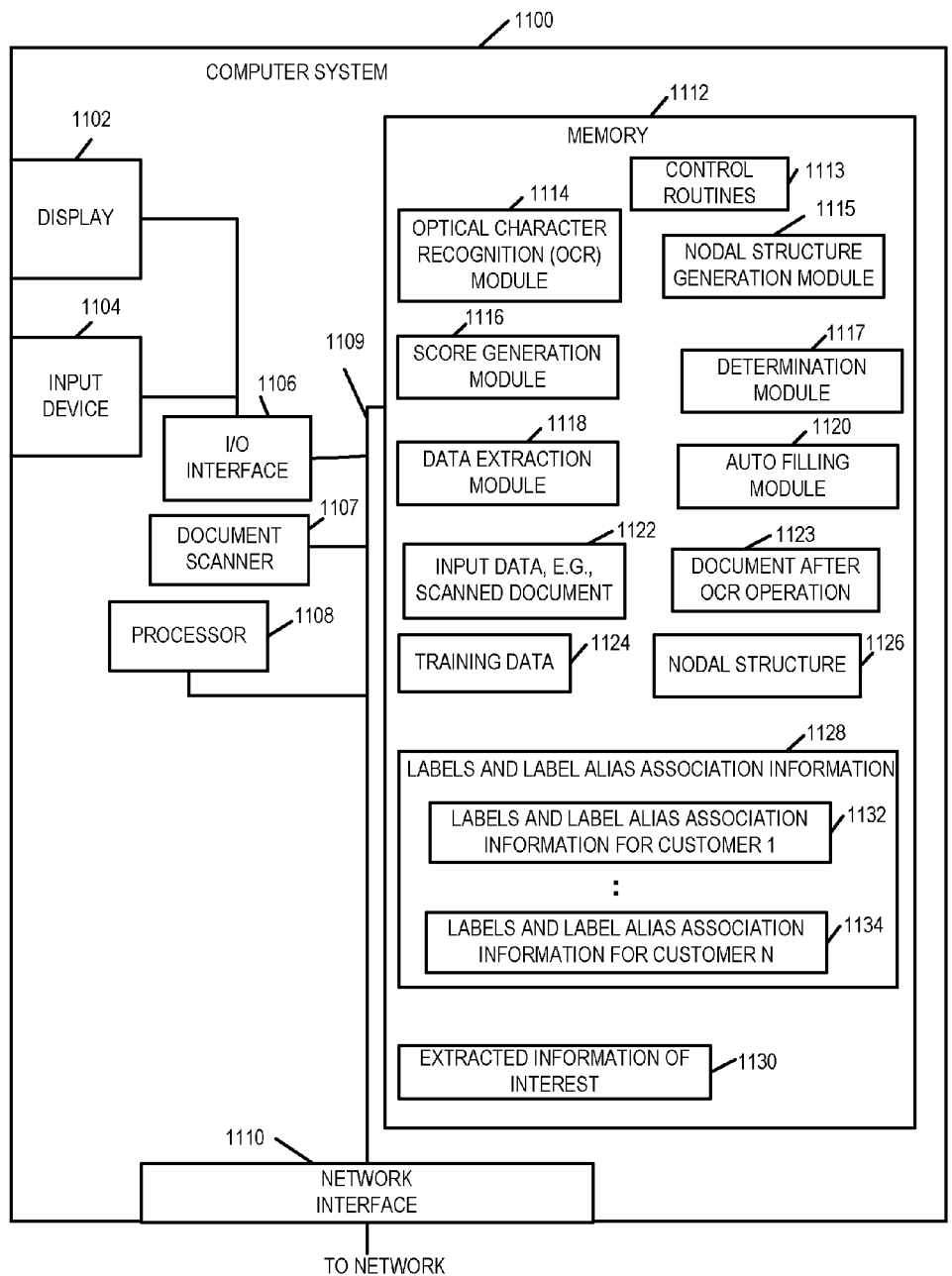

FIG. 11 illustrates an exemplary apparatus, e.g., system, implemented in accordance with an embodiment.

DETAILED DESCRIPTION

FIG. 1 illustrates an exemplary document 100 which can be processed in accordance with the invention to obtain information of interest. Document 100 is an invoice including various pieces of information that identify data corresponding to a service/goods supplier and a consumer/buyer. Data corresponding to the information included in the document 100 may be needed by different parties, e.g., supplier and/or buyer, for automated bill processing, payment, inventory update etc. Thus from the perspective of these parties it is important to be able to identify and obtain the data corresponding to information of interest from the document 100. Depending on the use of data, various pieces of information on a document may be of interest, for example such as, data corresponding to Invoice number, Work Order Number, Purchase Order Number, Invoice Date etc.

For the purposes of discussion, consider that the information of interest in the exemplary document 100 that a party seeks is the data corresponding to, e.g., Purchase Order Number (identified as PO Number 102 in FIG. 1). The data corresponding to the PO Number 102 is "DPFS-13012036" identified by reference number 104 in the figure. The party seeks to extract this data correspondent to the label "PO Number" as part of processing document 100, e.g., after the document has been binarized. The extracted data may be used for a various purposes, e.g., for automatically updating accounting books and/or purchased item logs by populating purchase order field in such logs with the extracted data.

While the Purchase Order Number information the interested party seeks is identified on the particular document 100 with the label "PO Number", it should be appreciated that on other different documents a Purchase Order Number may be identified with a different label, such as e.g., "Purchase Order", "P.O.", "PO", "P.O. No." or "P O No.". In order to be able to extract the data corresponding to Purchase Order Number out of all these different documents, each having a different label that identifies the data the interested party seeks to extract, having a number of different Purchase Order Number labels is desirable. Each of the different label identifiers "PO", "PO Number", "P.O. No." and "PO No." corresponding to the information of interest are called a Purchase Order Number Label Aliases.

In accordance with one feature of some embodiments, anytime a text string on the document that matches one of these aliases is found, it is considered that this text string is a valid candidate for being the label (i.e., "Purchase Order Number" in the example) that identifies the data to be extracted. It should be appreciated that on any given document, for any given label, there may be several label alias candidates. In some embodiment it has to be statistically determined which candidate is to be selected for extracting the corresponding data. Sometimes a text string on the document contains characters in the right sequence that would cause false identification and/or selection of that text string as a label alias candidate. Consider the exemplary document 100 shown in FIG. 1 example, the text string "PO Box 1110" contains the character sequence "PO" which is a valid label alias for the "Purchase Order Number" label. In accordance with one aspect of the invention, in order to prevent such text string, e.g., "PO Box" in the example, from being identified as a valid label alias for the Purchase Order Number label, the text strings are added to a nodal structure (also referred to as Spider Matrix) and assigned negative weights/probabilities which prevent them from being qualified as valid label aliases. This process is sometimes called as "poisoning" of a label alias. By adding the text string "Box" to a nodal structure as an object (also referred to as token) and assigning a negative probability weight, e.g., "−1" on links (also referred to as fingers) connecting the text string to other objects in the nodal structure, one or multiple paths through the nodal structure that goes through the "Poisoned" object/token will be poisoned (e.g., yielding a negative probability) and thus will not be identified as a valid label alias. Thus in some embodiments by taking the various label aliases and building a nodal structure with them, if a label alias candidate is a false positive, e.g., non-valid label alias, it can quickly be identified.

FIG. 2 is a drawing 200 illustrating an exemplary nodal structure, e.g., a Spider Matrix. A Spider Matrix is a self-built connection centric network of spider tokens. As each spider is added to the matrix, it seeks an optimal position in the network. In accordance with one aspect an optimal position for an added spider is the one in which it has the most connections.

A spider is an entity with a body (also referred to as the token or object), connection legs, and binding fingers (e.g., links that connect different objects). The drawing 200 depicts a 10 legged Spider Matrix of the alphabet. In the drawing 200, the tokens/objects in the nodal structure are represented by the large circles (202, 202' and 202") with the character in it, the legs are represented by the heavy lines 204 with the arrows pointing to a box which represents the binding hands 208, and the fingers (links) are represented by thin lines (212, 214, 216 and 218 as indicated by legend 210) connecting the binding hands together.

The illustration in FIG. 2 shows a very simple Spider Matrix because the alphabets include only one A, only one B, only one C, and so on. This means that each connection leg (e.g., 204, 204' etc.) of any spider in this Spider Matrix can have at most one finger binding. The legs are equally split between leader and follower flow. The arrow indicates the flow direction. In the drawing 200 there are five leader legs and five follower legs on each spider. The five leader legs connect (via the binding fingers 212, 214, 216, 218) to all spiders within five degrees of separation that have follower legs that can connect into each leader legs. Each lead is another degree of separation. As the drawing shows, A leads B and has only one degree of separation (line 212), it also leads C by two degrees of separation (line 214). Whereas B follows A and Leads C by only one degree each. Legs with no fingers binding them to other spiders are called terminating legs, meaning they connect to nothing. A spider with either all terminating leads or all terminating followers is called an end point. The legend 210 indicates different line patterns 212, 214, 216 and 218 used to indicate links connecting the binding hands of different objects.

It should be noted that if the flow gets disrupted, the network can recover. For example, if the character B was removed from the flow, the A, C, D, E, and F spiders all still have connections to each other and can determine that the B is missing.

Figure 3:
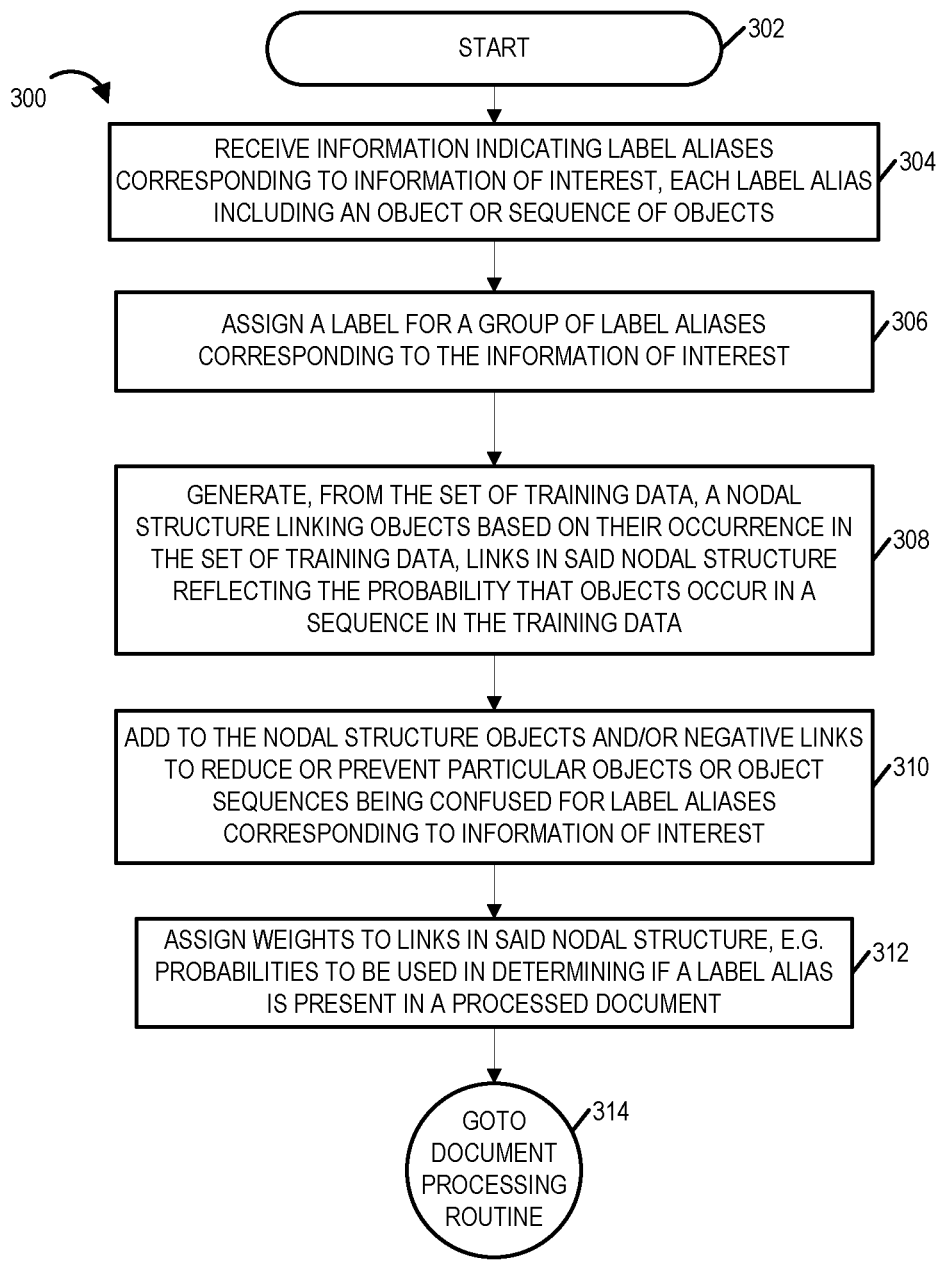
FIG. 3 is a flowchart illustrating an exemplary method of generating a nodal structure, which is sometimes referred to herein as a Spider Matrix, that can be used to recognize phrases of interest, e.g., content corresponding to an alias or label included in a document to facilitate extraction of information of interest from a document or documents including the recognized label or alias.

FIG. 3 is a flowchart 300 illustrating an exemplary method of generating a nodal structure, which is sometimes referred to herein as a Spider Matrix, that can be used to recognize phrases of interest, e.g., content corresponding to an alias or label included in a document to facilitate extraction of information of interest from a document or documents including the recognized label or alias. The generated nodal structure used for recognition of label aliases is normally produced for a client who has a list of information the client seeks to extract from a form or forms to be processed. With each piece of information there is usually a label alias on the form with the actual information of interest being at a know location relative to the location of the label alias. The term label alias is used to describe a term or phrase that can be used in a document to identify information of interest corresponding to a label. Multiple label aliases may be used to identify the same information which is identified by a label. The term "alias" is used before the term label because the term may be different from the "label" to which it corresponds and thus serves as an "alias" corresponding to the label. While the term used for the label may be used in a document and thus can be treated as an alias for the label, when the label is used in a document it is technically not an "alias" since it precisely matches the label. However, for purposes of explaining the invention a "label alias" maybe the label itself of a term or phase used to identify the same information to which the label corresponds. For example the label "last name" may have the corresponding label aliases "last name", "family name". As should be appreciated, last name and family name can both be used to identify a person's last name which is used as the label for a person's last name, i.e., the information to which the label "last name" corresponds. The location of information in a document maybe, an in many cases is, predetermined relative to the label alias. The possible locations may be known for a given customer since the customer normally has control over the forms which may be used by the customer and/or the customer's clients. See, for example, FIG. 7, with the information in the second column being exemplary of label alias that may be received in step 304.

As should be appreciated, each label alias includes an object or sequence of objects. Objects in alias may be, and sometimes are, words or groups of charters. Objects in an alias are normally separated by a space. For example, in the FIG. 7 example the first label alias includes a single word "company". The second label alias includes two objects "company" and "name" separated by a space. The third alias includes the single word "seller" which, in the case of the FIG. 7 example, is the label for the first group of aliases which includes aliases 1 though K. The set of aliases received in 304 represent the set of phrases which are to be detected for purposes of extraction of corresponding information. The aliases can be known from the set of forms which a customer seeks to have processed. Thus, in step 304 the customer can provide a list of label aliases or alternatively provide a representative set of forms, with known data entry positions, which can be processed to identify aliases for the information corresponding to the know data entry positions. At the end of step 304, the system has a set of label aliases which the system is to identify should a document be provided at some future time for the purpose of information extraction from a completed form, e.g., a form on which a user such as a patient or purchaser entered information, e.g., by hand. The set of label aliases represents what may be thought of as a dictionary of words or phrases that are to be supported and identified if present in a form received for processing and information extraction.

At the end of step 304, the system has groups of aliases corresponding to information which is to be extracted if present on a form received for processing. In step 306 the system assigns a label for each group of label aliases corresponding to the information of interest. In one embodiment label assignment is performed in an automated manner. A set of exemplary forms is processed and the number of occurrences of the individual label aliases is determined. As should be appreciated some label aliases will normally be used more frequently than others for the same information. The label, that is assigned in some embodiment to a group of label aliases corresponding to the same piece of information is automatically selected to be the most frequency used label alias for the information to which the group of label aliases correspond. For example, in the FIG. 7 example the term "SELLER" is selected as the first label since it was found to be most frequently used to identify the seller while the other label aliases in the first group might be used to identify the seller on some forms. As an alternative to the system automatically selecting and assigning a label to a group of label aliases which correspond to the same information which is to be extracted from processed forms, the user may specify the label to be used by the system for a group of label aliases. In this way a customer may specify a preferred label for a group of label aliases. In such a case, the label for a group of label aliases may not be one of the label aliases in the group and maybe a numerical code or other identifier that can be easily used by a machine thereby facilitating subsequent use of the information corresponding to the label which may be extracted when a label alias corresponding to the label is identified on a form.

With the label for each group of label aliases corresponding to a piece of information of interest, e.g., a piece of information to be extracted from a form if present, having been assigned in step 306, operation proceeds to step 308. In step 308 a set of forms with known content including the label aliases, i.e., a training set of data, is processed and the nodal structure to be used for recognizing the label aliases is generated. In step 308 a nodal structure of the type shown in FIG. 2 is generated with objects found in the training data being linked in the nodal structure based on their occurrence in the training data. For example, the nodal structure is created taking into consideration the order objects, that are present in one or more of the label aliases, occur in the set of training data. Link weights may, and in various embodiments are used, to indicate that one object will follow another connected object with, in some embodiments the link weight being determined as a function of the number of times the particular sequence of objects represented by the link occurs in the set of training data, e.g., representative forms with known content.

With the nodal structure to be used to support label alias recognition having been generated in step 308, operation proceeds to step 310. In step 310 the nodal structure is modified to include one or more links with probability weights which are intended to reduce or eliminate the probability that a particular undesired phrase will be recognized as a label alias. In particular, in step 310 objects and/or negative links are added to the nodal structure to reduce or prevent a particular object, objects, or object sequences being confused for label aliases corresponding to information of interest. In this manner, the nodal matrix can be modified to reflect object sequences which are likely to result from optical character recognition errors, which are known to occur for particular characters, and/or phrases which are similar to a desired label alias and may result in miss-recognition of a phase or word for a liable alias to decrease the probability that the erroneous or similar sequence will be recognized as a label alias of interest. Negative or zero weights may be, and are used, in some embodiments to decrease the probability that an erroneous or known similar phrase will be confused with and recognized as a label aliases of interest.

Operation proceeds from step 310 to step 312 in which weights are assigned to links in the nodal structure. In more advanced embodiments the weights are determined based on the probability that a particular sequence of objects represented by the link will occur. The weights assigned to links in the nodal structure, in one embodiment, represent probabilities to be use din determining if a label alias is present in a processed document. In some embodiments, rather than support a wide range of link weights, for simplicity of implementation relatively few weights are used, e.g., the set of weights −1, 0 and 1 are used in some embodiments with each link in the nodal structure being assigned one of these weights and with the negative value indicating a negative probability which will prevent an object sequence having a negative weight when scored against the nodal structure being recognized as a valid label alias.

At the end of step 312, the nodal structure which is to be used in recognizing label aliases in documents with unknown content will be ready for use. Thus, by step 312, the nodal structure will have information, e.g., objects and links, which allow scores to be generated for object sequences extracted from a document to be processed. The scores generated by comparing an object sequence to a document can be used to recognize, e.g., detect, the presence of any one of the label aliases received, e.g., identified by a user or in a training set of data, in step 304.

Figure 4:
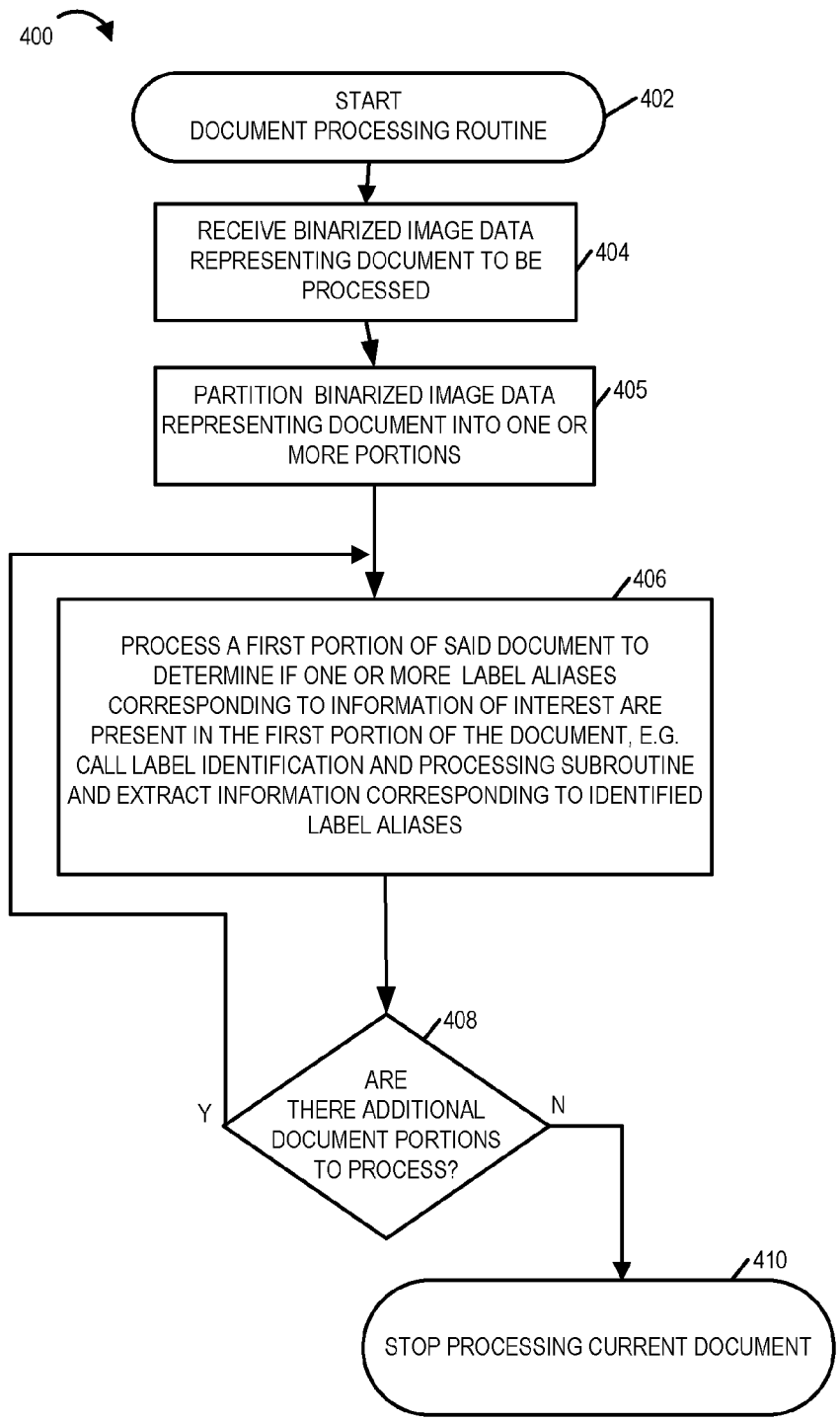
FIG. 4 is a flowchart illustrating an exemplary document processing routine in accordance with an embodiment.

With the training phase complete, operation proceeds from step 312 to the document processing routine, e.g., routine 400, shown in FIG. 4, via go to step 314.

FIG. 4 is a flowchart 400 illustrating an exemplary document processing subroutine in accordance with an embodiment. The document processing routine starts in step 402, e.g., when it is caller or activated to process a document, e.g., a binarized scanned form with information to be extracted. The information to be extracted maybe, and in some embodiments is, manually printed text, written information, or other information that was entered into a form by a user of the form.

Operation proceeds from start step 403 to data receiving step 404 in which binarized image data representation a document to be processed is received. The binarized image data, e.g., black and white representation of a page or pages of a form, maybe and in some embodiments is the output of a document scanning operation. The particular form which was scanned and the content of the form may not be know at the time of scanning and/or reception of the binarized image data generated by the scanning operation.

At the end of step 404, binarized image data representing a form to be processed has been received and is ready for further processing, e.g., partitioning, character recognition operations and/or label identification operations which are used to identify information of interest in the scanned document and to determine the location of the information on the page or pages of the document, e.g., form, being processed. Operation proceeds from data reception step 404 to partitioning step 405. In step 405 the document is partitioned into one or more portions for processing. The portions may, depending on the embodiment, correspond to different portions of a page or different pages of the document.

Figure 5:
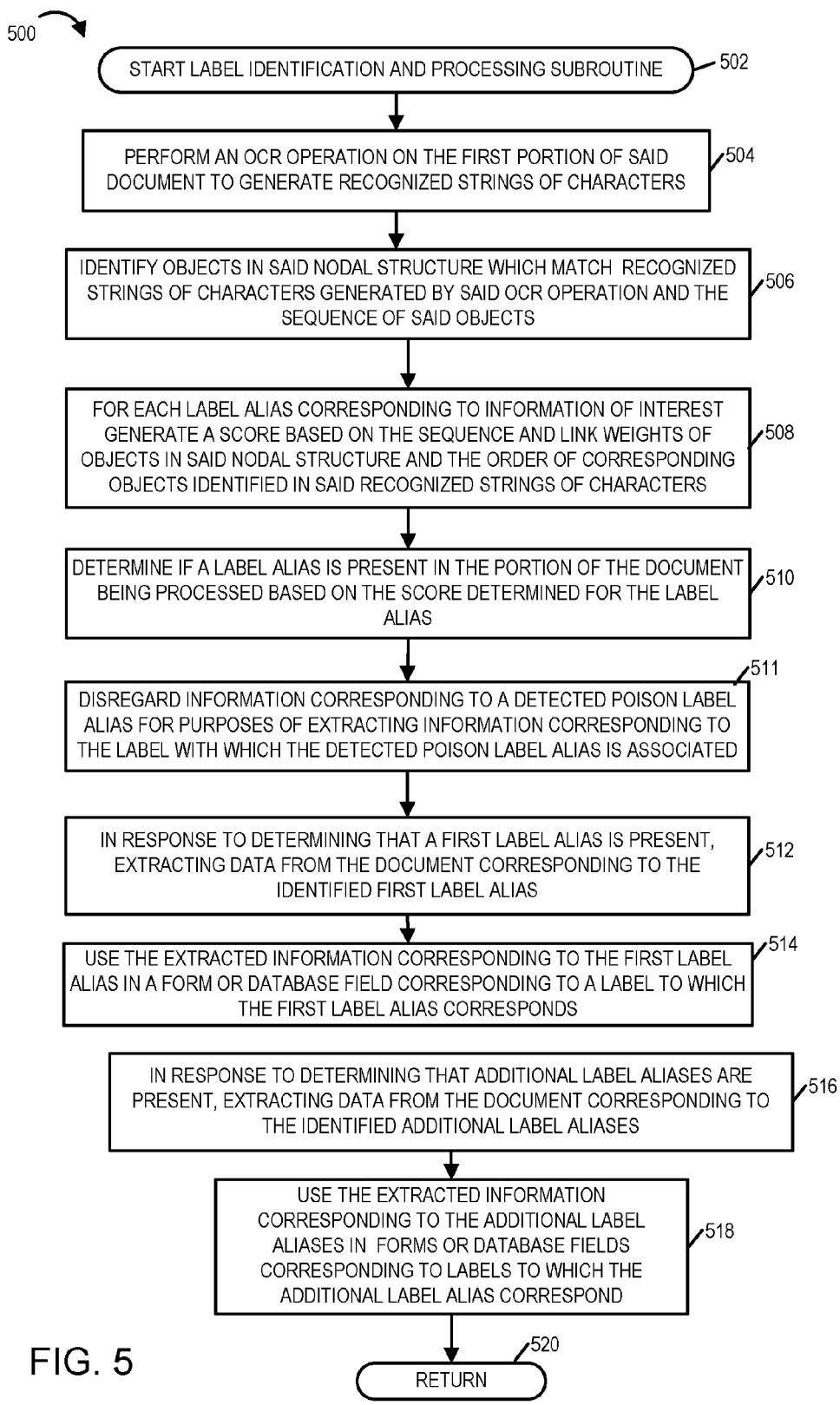
FIG. 5 illustrates a label identification and processing subroutine which can be used to identify the presence of a label or label alias in a portion of a document and then to extract information from the document corresponding to the label and/or identified label alias.

Operation proceeds from step 405 to step 406 in which an individual portion of the document is processed to determine if one or more label aliases corresponding to information of interest are present in the portion of the document being processed. Thus, in step 406 label aliases, if any, present in the document portion being processed are identified so that the information corresponding to a label associated with an identified label alias can be extracted from the document portion. Extraction of the information corresponding to identified label aliases is also performed in step 406. Step 406 may, and in some embodiments does involve a call to a label identification and processing subroutine such as that shown in FIG. 5 which can be used to identify label aliases corresponding to one or more labels and to extract the corresponding information. FIG. 5 will be discussed in further detail below.

Following label alias identification and information extraction on a portion of the document, operation proceeds from step 406 to step 408 in which a determination is made as to whether there are additional document portions remaining to be processed. If in step 406 it is determined that there are additional document portions to be processed, operation proceeds from step 408 once again to step 406 with step 408 being applied to the next document portion to be processed. In step 408 if it is determined that there are no additional document portions to process, i.e., the document has been fully processed, operation proceeds to stop step 410 in which processing of the current document stops and routine 400. Routine 400 may be called on an ongoing basis, e.g., to process multiple documents. Accordingly, after the information from a current document being processed has been extracted, the routine may be used to process another document.

The methods are well suited for processing a wide variety of forms, e.g., insurance forms or other forms, where users may manually enter information in one or more locations and it may be desirable to process the forms to automatically extract and then use the information, e.g., to populate information fields in a database or an electronic version of the same or a different form. For example, patient information may be extracted and then used to populate a hospital or doctor record that will be used by the doctor or hospital as a part of a patient treatment record.

FIG. 5 illustrates a label identification and processing subroutine 500 which can be used to identify the presence of a label or label alias in a portion of a document and then to extract information from the document corresponding to the label and/or identified label alias. The method may, and in various embodiments does use, a matrix of linked objects such as the previously discussed spider matrix to generate scores for sequences of objects in the document with the scores being used to determine whether a label alias corresponding to a label is present.

The method 500 begins in step 502, wherein the routine is called by another routine such as the document processing routine 400 of FIG. 4 or is initiated for a particular portion of a document in another manner.

Operation proceeds from start step 502 to OCR step 504. In step 504 an optical character recognition (OCR) operation is performed to identify strings of characters. The strings of characters may represent words and/or phrases, in the scanned document. Operation proceeds from step 504 to step 506 in which the strings identified in step 504 are processed to determine what objects, e.g., characters, words, phrases and/or character stings represented as nodes in the nodal structure used for label alias purposes. In some embodiments individual characters, e.g., text or punctuation characters, are used as objects in the nodal structure. The objects are potential components of one or more label aliases. With objects, e.g., text characters, of label alias having been identified in step 506, operation proceeds to step 508 wherein scores for label aliases which maybe in the document portion being processed are generated. The scores are generated based on the identified objects in the document portion being processed and the order, e.g., sequence, in which the identified objects occur in the document portion being processed. In some embodiments a separate score is generated for each string of the document portion being processed which matches a sequence which is represented in the nodal matrix as a sequence of interconnected objects. As a result of the processing performed in step 508 scores will be generated from the nodal matrix for each object, e.g., character, string in the document portion being processed which is also found in the nodal structure. Thus a score will be generated for each label alias corresponding to a label which is found in the document portion being processed.

In step 510 the scores generated from applying the document contents to the nodal matrix are examined to determine which, if any, label aliases are present in the document portion which was processed.

In step 511 text strings which resulted in the detection of a poison label alias are disregarded and not used to identify information to be extracted with regard to a label with which the poison label alias is intentionally associated. Thus, a detected text string corresponding to a poison label alias will not affect information extraction with respect to the label with which the detected poison label is associated.

Operation proceeds from step 511 to step 512 in which information, e.g., data, corresponding to a first label, that is associated with a first label alias that was detected in the document, is extracted. This may be achieved by extracting information in a location or locations in the document relative to the location of the detected first alias in the document. Consider for example if in the FIG. 7 embodiment the alias K "SUPPLIER" corresponding to the first label "SELLER" was identified in the document portion being processed. In such a case information at the location indicated in table 700, e.g., to the right of the identified label alias "SUPPLIER" would be extracted from the document in step 512.

Operation proceeds from step 512 to step 514 in which the extracted information corresponding to the both the first label and associated first label alias is used to fill in an entry corresponding to the first label on a form and/or to populate a field in a database to which the first label corresponds. In this way the information is made available for subsequent use and/or directly used to complete a form. For example, the information extracted from a patient completed form may be put into a medical data base or electronic record for use in documenting the patients condition and for providing a doctor the patient entered information on another medical form at a future point in time.

Operation proceeds from step 514 to step 516 in which, in response to determining that additional label aliases are present in the portion of the document which was processed, the information corresponding to the additional identified labels is extracted. Operation proceeds from step 516 to step 518. In step 518 the additional information extracted in step 514 corresponding to additional detected label aliases and their corresponding labels is used. For example the extracted information corresponding to the additional non-poison label aliases is used to add information to one or more forms and/or to populate database fields corresponding to the additional labels associated with the identified additional label aliases.

In the above described manner, using a nodal matrix of the type described in the present application, label aliases can be detected in a document and information corresponding to non-poison label aliases can be extracted and used for a variety of purposes.

Thus the methods described herein address the technical problem of identifying information of interest in forms having unknown content at the time of scanning, extracting useful information corresponding to label aliases used to identify the information of interest and then allowing for the information to be used to generate paper or other forms and to provide services to customers.

Operation proceeds from step 518 to step 520 wherein operation returns from the label identification and processing subroutine 500 to the routine which called the subroutine. Thus, the routine 500 may be called multiple times, e.g., once per document portion, until a document is fully processed.

FIG. 6, which comprises the combination of FIG. 6A and FIG. 6B, is a flowchart 600 illustrating an exemplary method of obtaining information of interest from a document, e.g., binarized document, in accordance with one embodiment. The method of flowchart 600 can be, and in some embodiments is, implemented by an apparatus/system such as that illustrated in FIG. 11. The exemplary method starts in step 602 with the system being powered on and initialized. Operation proceeds from start step 602 to step 604.

In step 604 information associating a first plurality of different label aliases with a first label for first information of interest is stored, e.g., in the system memory. Operation proceeds from step 604 to step 605 wherein information associating a second plurality of different label aliases with a second label for second information of interest and information associating another plurality of different label aliases with additional labels for additional information of interest is stored. While shown in the flowchart 600 as different steps, in some embodiments steps 604 and 605 may be performed as a single step. The information associating various different label aliases with corresponding different labels may be stored as part of training the system as discussed in detail with regard to flowchart 300. In various embodiments each label and label alias includes one or more objects. Each object may include a character or a string of characters, e.g., letters, numbers etc. As discussed earlier with regard to FIG. 1 example, the information of interest may include data corresponding to information that a party, e.g., customer, seeks.

Operation proceeds from step 605 to step 606. In step 606 information representing an expected relationship between objects of a first label alias in the plurality of different label aliases is stored in a nodal structure, e.g., spider matrix. Individual objects of the first label alias being linked in the nodal structure to other objects, each of the linked objects being a character or character string, individual links in said nodal structure having a probability associated with the individual link. Operation proceeds from step 606 to step 607 where information representing an expected relationship between objects of a second label alias is stored in a nodal structure. Operation proceeds to step 608 where information representing an expected relationship between objects of additional label aliases is stored in a nodal structure. While shown in the flowchart 600 as different steps, in some embodiments steps 606, 607 and 608 may be performed as a single step. The nodal structure is generated in the manner discussed in detail with regard to flowchart 300. In various embodiments objects, e.g., character or string of characters, of a label alias is linked to one another and may be linked to objects of another label alias. In some embodiments the probability associated with a link is one of at least 3 distinct values. In some embodiments the three distinct values include a positive value, a zero value and a negative value. In some embodiments the negative value is associated with a link to an object which if present is to result in a probability score which will preclude recognition of a label alias corresponding to the negative probability value.

In various embodiments the links in the nodal structure correspond to candidate object sequences, e.g., sequence of objects corresponding to a label alias. In some embodiments directions are associated with the links, links entering an object forming a link to a preceding object which may occur in a candidate object sequence, links leaving an object forming a link to a subsequent object which may follow an object in a candidate object sequence. The objects of a label alias stored in the nodal structure follow a sequence. For example, for a label "INVOICE NUMBER" a first alias may be, e.g., "INV NUMBER". There are two objects of the label alias in accordance with one aspect, the first being "INV" and the second being "NUMBER" which are linked together in a sequence such that object "NUMBER" follows object "INV" and the link between the two has a probability associated with it. The concept will become clearer in the examples discussed later.

Consider that the nodal structure includes various label aliases for labels that the system expects to be present on one or more binarized documents being processed by the system implementing the method of flowchart 600. The following discussion focuses on the processing of a binarized document to obtain information of interest from the document. The document may be, e.g., such as document 100 illustrated in FIG. 1 and/or another document such as an invoice, billing statement, survey form, insurance form, application form etc.

Operation proceeds from step 608 to step 610. In various embodiments the system processes a first portion of the binarized document to determine if label aliases corresponding to information of interest are present in a first portion of the binarized document. This is performed in step 610 by processing, e.g., comparing, the first portion of the binarized document against the nodal structure to generate scores for multiple label aliases in the nodal structure. In some embodiments the document is subject to OCR (optical character recognition) operation prior to being used for generating scores. The current portion of the binarized document being processed serves as an input to the nodal structure in the score generation process. In some embodiments the multiple label aliases in the nodal structure which match recognized strings of characters in the document generated by OCR operation are identified as valid label aliases present in the current portion of the document. In various embodiments score is generated for each label alias based on the sequence of objects (character or a string of characters) and link weights of objects in the nodal structure and the order of corresponding objects (recognized characters) in the first portion of document. In various embodiments a determination whether or not a label alias for a label corresponding to information of interest is present in the current portion of document is made based on the generated scores.

Operation proceeds from step 610 to steps 611 and 612 where processing occurs in parallel along the paths corresponding to these steps. As should be appreciated from the flowchart, while two parallel paths (corresponding to steps 611, 613, 615 and 612, 614 and 616) have been shown, there may be as many similar branches as the number of scored label aliases. In step 611 it is determined, based on the generated scores of multiple labels, if the first label alias is present in the first portion of the document. Operation proceeds from step 611 to step 613. Assuming that it is determined that the first label alias is present in the first portion of the document, in step 613 information from the first portion of the document corresponding to the first label alias is extracted in response to determining that said first label alias is present in said first portion of the binarized document. Operation proceeds from step 613 to step 615 where a field corresponding to a label with which the first label alias is associated is populated on a document, e.g., a form, with the extracted information corresponding to the first label alias. Operation proceeds from step 613 to step 624 via connecting node A 622.

Referring now to steps 612, 614 and 616 along the other path. In step 612 it is determined, based on the generated scores of multiple labels, if a Kth label alias (e.g., associated with a label corresponding to information of interest) is present in the first portion of the document. Operation proceeds from step 612 to step 614. Assuming that it is determined that the Kth label alias is present in the first portion of the document, in step 614 information from the first portion of the document corresponding to the Kth label alias is extracted. Operation proceeds from step 614 to step 616 where a field, corresponding to the label with which the Kth label alias is associated, is populated on the form with the extracted information corresponding to the Kth label alias. Operation proceeds from step 616 to step 624 via connecting node A 622.

Returning to step 624. In step 624 it is determined if there are any additional portions of the binarized document to be processed, e.g., for identifying label aliases and extracting corresponding information of interest. If it is determined that all document portions have been processed the operation proceeds to step 626 where the system decides to stop processing the current document. However if it is determined that there are additional portion(s) of the binarized document to be processed the operation proceeds to step 628.

In step 628 the system scores additional portions of the binarized document against the nodal structure to determine scores for multiple label aliases in the similar manner as discussed with regard to step 610. Thus for one or more additional document portion(s), e.g., a second portion of the document, score is generated for each label alias in the nodal structure to determine, based on the generated scores, if label aliases for which corresponding information of interest is sought by the system, are present in the additional document portions. Thus in various embodiments the processing as discussed with regard to steps 611, 613, 615 and 612, 614 and 616 is repeated for addition document portion(s).

Operation proceeds from step 628 to steps 630 and 632 along the two paths where the processing similar to steps 611, 613, 615 and 612, 614 and 616 is performed thus repeating the operation for additional portion(s) of the document. In step 630 it is determined, based on the generated scores of multiple labels, if the first label alias is present in the additional portion(s) of the binarized document. Operation proceeds from step 630 to step 634. Assuming that it is determined that the first label alias is present in the additional portions of the document, in step 634 information from the additional portion of the document corresponding to the first label alias is extracted in response to determining that the first label alias is present in the additional portion(s) of the binarized document. Operation proceeds from step 634 to step 636 where a field corresponding to a label with which the first label alias is associated is populated on a document, e.g., a form, with the extracted information corresponding to the first label alias. Operation proceeds from step 636 to step 642.

In step 632 it is determined, based on the generated scores of multiple labels, if an Mth label alias (e.g., associated with a label corresponding to information of interest) is present in the additional portion(s) of the document. Operation proceeds from step 632 to step 638. Assuming that it is determined that the Mth label alias is present in the additional portions of the document, in step 638 information from the additional portions of the document corresponding to the Mth label alias is extracted. Operation proceeds from step 638 to step 640 where a field, corresponding to the label with which the Mth label alias is associated, is populated on the form with the extracted information corresponding to the Mth label alias. Operation proceeds from step 640 to step 642. In step 642, following completion of processing of desired document portions, the system stops processing the current binarized document. Additional documents may be processed in a similar manner.

FIG. 7 illustrates an exemplary set of information 700 including a plurality of labels corresponding to information of interest, label aliases associated with each of the labels and a corresponding location of the information of interest relative to the location of the label alias. The set of information 700 may be stored in an exemplary system used for processing documents to locate and obtain information of interest, e.g., such as the system 1100. In some embodiments the set of information 700 is generated from information provided by a customer and may be unique to that customer. The customer may be, e.g., a company/organization whose documents, e.g., forms and/or other documents, are processed by the system in which the information 700 is stored. Thus the labels corresponding to information of interest, one or more associated label aliases and the location of the information of interest on a document, e.g., a specific fillable field on a given form, is known to the customer who provides this information using which the information set s generated. In various embodiments the system 1100 stores a plurality of such information sets for various different customers with each such information set being used by the system to map an identified label alias to its corresponding label and determine the location of the information of interest.

Column 702 indicates the labels corresponding to the information of interest, column 704 indicates various label aliases associated with the label identified in the corresponding row and column 706 indicates the location of information of interest relative to a label alias.

Each of the rows 710, 712, . . . , 720 corresponds to an individual label corresponding to which information of interest may be sought, e.g., from a document. A document may have the labels themselves or label aliases corresponding to the labels. The customer desires to extract the information of interest, e.g., data, corresponding to the labels or label aliases that appear on the document. As shown each label may have one or more label aliases associated with it (shown in column 704) which may appear on a document being processed. It can be further appreciated from the information table 700 that corresponding to each label alias, associated with a label, there is a corresponding specified location of information of interest where the actual data of interest can be found relative to the location of an identified label alias. In some embodiments there may be a predetermined mapping between the location of a label alias and corresponding information of interest on a document. In many cases such mapping would normally be known to the customer/client.

Consider that the exemplary set of information 700 corresponds to the same customer for which the exemplary document 100 is processed. As illustrated in the figure, row 710 corresponds to a label "SELLER". The label "SELLER" is associated with a plurality of label aliases shown in column 704 in the corresponding row 710. In the example of FIG. 7 there are K label aliases associated with the label "SELLER", including Alias 1: "COMPANY", Alias 2: "COMPANY NAME", Alias 3: "SELLER", . . . , Alias K: "SUPPLIER". Thus the label "SELLER" may appear as any one of these aliases on a document. Corresponding to each of the label aliases corresponding to row 710 that may be identified on a document, the location of information of interest is specified in a corresponding entry in column 706. The customer desires to extract information of interest, e.g., data, correspond to the label "SELLER" which may appear by various corresponding label aliases on different documents, one such exemplary document is e.g., document 100. For an identified label alias the system can lookup information set 700 to determine the corresponding location of information of interest for the label alias. For example, consider that as art of document processing in accordance with the features of invention, Alias 1: "COMPANY" is identified on a document (e.g., as in document 100). Now the customer/client desires to extract the data corresponding to the label alias "COMPANY". A corresponding entry in column 706 indicates that the information of interest corresponding to alias "COMPANY" is located "TO THE RIGHT OF ALIAS". Thus after consulting information 700 the system knows it can extract the information of interest from the document from the specified location which is a location relative to the corresponding label alias. In this example the information of interest is the name of the seller that appears on the document. It can be seen by referring to FIG. 1 that on document 100, the name of the company "A&K ENERGY CONSERVATION INC." appears to the right of label alias "COMPANY". Thus the system extracts the data, e.g., "A&K ENERGY CONSERVATION INC." in this example from the document 100 being processed. The Extracted information may be used by the system for a variety of purposes, e.g., to automatically fill out fields on one or more other documents which may then be printed and/or used for other purposes.

As can be appreciated from the FIG. 7, location of information of interest for various other possible aliases that can be expected on different documents is also indicated in column 706, e.g., Below the Alias, Above the Alias etc.

Row 712 corresponds to a label "PURCHASER". The label "PURCHASER" is associated with M label aliases shown in column 704 in the corresponding row 712, including Alias 1: "SOLD TO", Alias 2: "CONSUMER", Alias 3: "BUYER", . . . , Alias M: "CONSUMER NAME". Thus the label "PURCHASER" may appear as any one of these aliases on a document. Corresponding to each of the label aliases the location of information of interest is specified in a corresponding entry in column 706. For example, for Alias 1: "SOLD TO" the information of interest is indicated to be located "BELOW ALIAS". The information of interest is the data corresponding to alias associated with the PURCHASER that appears on the document. Referring to document 100 of FIG. 1, the PURCHASER appears by alias a "SOLD TO" and the information of interest appears BELOW THE ALIAS as "HILLSBOROUGH COUNTY REAL ESTATE DEPT R3M". Thus the system extracts this information from the document 100 being processed. As illustrated in the figure, there may be a number of other rows corresponding to labels for which information of interest is to be extracted.

Similarly the last row 720 corresponds to a label "INVOICE NUMBER". The label is associated with X different label aliases shown in column 704 in the corresponding row 720, and the label "INVOICE NUMBER" may appear as any one of these aliases on a document. As discussed above the location of information of interest is specified in a corresponding entry in column 706 corresponding to each of the label aliases.

FIG. 8 is a drawing illustrating another exemplary nodal structure, e.g., spider matrix 800, which is more complex than that shown in FIG. 2. The drawing shows the exemplary matrix 800 which includes three words: ABOUT, ABOVE, and ABORT. These words may be from a set of training data. The words may be used as label aliases. As part of generating the nodal structure as each word is added to the matrix, each word finds its position in the flow by maximizing its leg connections (thick black lines with point arrows). While each spider has a rigid structure for leg count, there is no limit on the number of fingers (e.g., links) each leg may have attached to it. For example if the word "ABLE" was added to the matrix 800, legs on spiders A and B would grow new fingers (links) on the follower legs the L and E would attach leader legs too after the L and E are added to the Matrix. In the example of FIG. 8 note that each leg has a dispersion weighting factor. The dispersion weight is the inverse of the number of fingers attached to that leg. In accordance with one aspect the Bayesian aprior probability of a connection between two spiders is the product of the dispersion weights of the two legs it binds together. The legend 810 shows various different line patterns 812, 814, 816, 818 and 820 used to represent different fingers (links) between the spiders. In the example matrix 800 the fingers (links) represented by line pattern 820 (shown in the legend 810) indicate that more than one word solution shares the finger bindings.

With reference to the nodal structure 800, consider an example where the system is requested to generate scores for the objects (e.g. label aliases) in the nodal structure 800 to determine which label aliases are present in the document given an input sequence such as the character sting "ABOUT" to determine which if any of the words (label aliases) modeled by the spider matrix is present or not in the document being processed. In the example this is done by calculating the probability spread for various words in the nodal structure given an input character string. In other words the system determines the probability spread, as reflected by the different scores for the different modeled words, if the word ABOUT is used to interrogate the Matrix.

If the input document includes the phrase about, the "source"=ABOUT and this will result in various scores for different label aliases, e.g., words, when scored using the exemplary spider matrix 800 which models three label aliases: ABOUT, ABOVE and ABORT.

The calculation of the probability score is shown below when the input phrase is ABOUT and the label alias is ABOVE:

$$ABOVE=\{[((1.0*1.0)+(1.0*1.0))/4]+[(1.0*1.0)/3]+[(0)/2]+(0)\}/4=0.207$$

The calculation of the probability score is shown below when the input phrase is ABOUT and the label alias is ABOUT:

$$ABOUT=\{[((1.0*1.0)+(1.0*1.0)+(0.3*1.0)+(0.5*1.0))/4]+[((1.0*1.0)+(0.3*1.0)+(0.5*1.0))/3]+[(0.3*1.0)+(0.5*1.0))/2]+(1.0*0.5)\}/4=0.53$$

The calculation of the probability spread (score) is shown below when the input phrase is ABOUT and the label alias is ABORT:

ABORT={[((1.0*1.0)+(1.0*1.0)+(0.5*1.0))/4]+
[((1.0*1.0)+(0.5*1.0))/3]+[(0.5*1.0)/2]+(0)]}/
4=0.453

Note that the score for ABOUT is 0.53 representing a 53% probability that the term ABOUT has been detected. This is more than a 50% probability of a match assuming use of a 50% probability detection threshold would result in a determination that the label alias ABOUT had been detected.

It can be appreciated from the matrix 800 that since ABOUT is present in the matrix the probability for a match should be very high given that there will be a perfect match with one of the modeled words, i.e., ABOUT. However even though ABOUT has a perfect match, the probability of the interrogating word being ABOUT is 53% in the example. This is because the matrix 800 anticipates the possibility that the interrogating word is really a damaged "ABOVE" or "ABORT", both of which return a smaller probability value, i.e., a probability below 50%. If scored, an input word like "ADORE" would also return a probability spread, but the probability values would be much smaller, e.g., below 50% resulting an a failure for the input ADORE to be recognized as any of the modeled words.

As should be appreciated, the probabilities may change as the number of words in the matrix. In some embodiments the probability is relative and recalibrated every time a new spider is added to the matrix. The detection threshold which is used to indicate successful detection may also be changes as the number of words in the matrix is changed to take into consideration the expected effect on scores. In at least some embodiments, as the matrix grows, the probability spreads get larger and the probability values get smaller.

In the FIG. 8 example, only one set of probabilities were used. However in some embodiments several sets of probabilities based on the characteristics of the input data may be used. This is in a sense, building heuristics into the matrix. For example, the sentence "throw my cow over the fence some hey" is improper grammar. A spider matrix could be defined that would deduce this statement down to, "throw cow over fence". Using a "Casual Bayesian Network" as a model where each word in the spider is given probability densities based on whether it is a noun or a verb (and other part of speech), a suggested "proper grammar" sentence could be generated.

One useful exemplary embodiment of a nodal matrix used in some embodiments, e.g., a spider matrix, is not based on a Casual Bayesian Network model with a wide range of link probabilities but rather uses a fixed limited number of link weights. An application of this simple embodiment of a Spider Matrix is used in one exemplary document recognition implementation. The exemplary document recognition implementation includes taking bitmap images of documents, recognize and extract the data in the document the customer wishes to extract out. The method used for this is with a method called Label-Value data coupling. In order for the system to extract the data Value out of the document, it has to be able to locate and identify the data Value which may be anywhere on the document images. To do this the system allows the user to identify the Value Data with Label Data. For example, if the system is to find and extract a persons name out of a document image, and on all the documents to be searched the name is associated with a labeling text line "Applicants Name", then "Applicant Name" would be the label used to locate the name being searched for. For such an application a less complicated, faster version of Spider Matrix would achieve the design requirements, thus the embodiment of a Spider Matrix, e.g., used in the document recognition implementation, is a much simpler Trinary Spider Matrix. Instead of calculating a dispersion weighting factor for each finger, we force the probability to either a: 100, 0, or −100 (i.e. A Trinary). When the matrix is built, all finger dispersion weighting factor are set to "100" (100%) for valid label configurations and "−100" (−100%) for poison configurations, e.g., false label aliases which should not be confused for actual proper labels and/or label aliases. Instead of using the Bayesian like formula, we just multiplying all the finger probabilities together. Thus if one of the connections are poisonous, we would get a negative probability and the system ignores the label aliases with negative probabilities thereby preventing such false label aliases from being confused for proper label aliases.

In the example just given, the terminology "a labeling text line" is used to present "Applicant Name". "Applicant name" would actually be just one of the many Label Aliases that could be associated to a Label for Applicant name information on a document. Other Label Aliases may be "Name of Applicant", "Applicant", or "Name". The Label Alias is the exact text that may appear on the document to identify the person's (Applicant) name. The "Label" is a name given the operation or set of rules that are to be used to locate and extract the data the user wishes to extract, which in this case is the Person of Interest Named on the Document. So the Label itself may be "Person Of Interest" and all the Label Aliases associated with the Label will invoke the one operation or set of rules assigned to the label "Person Of Interest" when one of the Alias is found on a document being processed.

The spiders are word tokens (e.g., objects which may be character or string of characters). For example, the Label "Invoice Date" in a Label dictionary (e.g., information set associating labels with corresponding aliases) has as an Alias entry "Date of Invoice". A token string composed of three tokens is built, the "date" word token, the "of" word token, and the "invoice" word token (where tokens are composed of lower case characters in some embodiments). A first degree finger connects "date.FollowerLeg(0)" to "ofLeaderLeg(0)" and a second degree finger connects "date.FollowerLeg(1)" to "invoice.LeaderLeg(0)". Another first degree finger connects "of.FollowerLeg(1)" to "invoice.LeaderLeg(1)". Each Alias of each Label in the Label dictionary will have a token string in a Spider Matrix.

FIG. 9 is an exemplary nodal structure, e.g., spider matrix 900, which is used to facilitate an understanding of poison labels. FIG. 10 is a chart 1000 which illustrates various phrases which may be scored using the matrix 900 shown in FIG. 9 and the corresponding scores which will be generated if the indicated phrase is scored. The chart 1000 is divided into four sections with each section including labels aliases scored using the spider matrix 900. Each line in each of the section of the chart 1000 corresponds to a different phrase (alias) and corresponding score. The chart 1000 is broken into four sections, a set of poison label aliases 1002, a set of valid label aliases 1004, a set of non label aliases 1006 and a set of improper label aliases 1008. Note that the scores associated with the poison label aliases are intentionally negative, e.g., due to the "poisoning" of one or more phrases added to the spider matrix 900.

Poison labels will now be discussed. Because some defined Label Alias such as "P. O." for a label Purchase order may actually be part of another text string like "P.O. Box", false positives are possible. To prevent "P.O. Box" becoming a false positive for "P.O.", in accordance with one aspect of some embodiments "P.O. Box" is to be marked in such a way that is readily recognized as a false positive and thus not identified as a valid label alias. In some embodiments this is done by assigning −100 weights to all finger bindings between "O." and "Box" and "P." and "Box". When the probability is calculated the negative weight will yield a negative probability, indicating this is a false positive. Care must be taken in selecting Poison Labels, in some cases an even number of Poison Labels in a text string, may still yield a false positive.

While each finger has not one just probability value, but rather an array of probability values (one for each type of label or label alias the system is looking for). In the current example only one of the probability values in each array is set to 100 (or −100 if it's a poison finger), the rest are set to zero. Thus when the fingers' probabilities are multiplied to each other only one possible combination will yield a non-zero value. This is the label alias the words in the token chain represent. If the yield is a zero value, then the token chain does not represent any labels in the dictionary.

FIG. 11 illustrates an exemplary system 1100 implemented in accordance with an embodiment. The exemplary system 100 can be, and in some embodiments is, used to implement the method of flowchart 600. In some embodiments the system 1100 performs binarization operation on a received data, e.g., input document, and processes the document in accordance with the invention to obtain information of interest corresponding to labels.

As shown in FIG. 11, the system 1100 includes a display device 1102, an input device 1104, an input/output (I/O) interface 1106, a processor 1108, a network interface 1110 and memory 1112 coupled together via bus 1109. The system 1100 further includes a document scanner 1107 which may be part of the system 1100 in some embodiments or may be attached as an external device. The input device 1104 may be a keypad, touch screen sensor, and/or a microphone for receiving and processing customer input commands. The various elements of the system 1100 can exchange data and information over the bus 1109.

The I/O interface 1106 maybe a wired or wireless interface via which the system 1100 can be coupled to one or more other devices. The document scanner may be, and in some embodiments is, used to scan one or more documents. The scanned documents are stored in the memory for further processing in accordance with the features of invention.

The processor 1108, e.g., a CPU, executes routines 1113 and one or more modules and controls the system 1100 to operate in accordance with the invention. To control the system 1100, the processor 1108 uses information, various modules and/or routines including instructions stored in memory 1112. In one embodiment the processor 1108 is configured to perform functions corresponding to various steps of the method of flowchart 600. In some embodiments the processor 1108 is configured to implement each of the modules shown included in the memory 1112.

Via the network interface 1110, the system 1100 can communicate and exchange signals and/or information with other devices over a communications network. The network interface 1110 maybe a wired, e.g., Ethernet interface, or wireless interface.

In addition to the routines 1113, the memory 1112 includes a nodal structure generation module 1114, score generation module 1115, a determination module 1116, a data extraction module 1118, an auto data filling module 1120, input data 1122, training data 1124 and stored information including label and label alias association information 1126.

Routines 1113 include communications routines and/or control routines. In some embodiments the routines 1113 include the one or more subroutines discussed with regard to FIGS. 3-5, e.g., nodal structure generation routine, document processing routine and label identification and processing subroutine. The OCR module 1114 is configured to perform optical character recognition operation on an input document, e.g., scanned document 1122. The resulting OCR document generate as a result of the OCR operation is stored as document after OCR operation 1123.

The nodal structure generation module 1115 is configured to generate a nodal structure, also referred to as the spider matrix, from a set of training data. The generated nodal structure 1126 is an output of nodal structure generation module 1115. The generated nodal structure 1126 links objects (e.g., character or character strings) based on their occurrence in the set of training data, the links in the nodal structure reflecting the probability that objects occur in a sequence in the training data. The generation of nodal structure is discussed with regard to FIGS. 3 and 6 and thus the discussion will not be repeated. In various embodiments information representing an expected relationship between objects of one or more label alias is stored in the nodal structure, with the individual objects of a first label alias being linked in the nodal structure to other objects, each of the linked objects being a character or character string, individual links in the nodal structure having a probability associated with the individual link. In various embodiments one or a plurality of objects associated with negative weights (which thereby produce negative probabilities to be associated with the objects) are added to the nodal structure 1126 to reduce or prevent the particular objects or object sequences from being considered as proper valid label aliases, e.g., preventing such objects or object sequences from being confused for label aliases corresponding to information of interest. As discussed earlier such an operation is called poisoning of labels and/or label aliases in some embodiments. Thus in various embodiments the system 1100 is configured to reject such defined objects or object sequences (also referred to as poison label aliases) based on the negative scores that such objects or object sequences yield owing to the fact that they have intentionally been associated with negative link weights.

The score generation module 1116 is configured to score one or more portions of the input document against the generated to nodal structure to generate scores for various labels and/or label aliases in the nodal structure in accordance with the features of the invention. In various embodiments scores for multiple label aliases in the nodal structure are generated to determine, based on the scores, if a currently processed portion of the document includes label aliases corresponding to information of interest. In some embodiments the multiple label aliases in the nodal structure which match recognized strings of characters in the document generated by OCR operation are attributed positive scores and thus identified as valid label aliases present in the current portion of the document. In various embodiments the score generation module 1116 is configured to generate score for each label alias based on the sequence of objects (character or a string of characters) and link weights of objects in the nodal structure and the order of corresponding objects (recognized characters) in the portion of document being processed. In various embodiments a determination whether or not a label alias for a label corresponding to information of interest is present in the current portion of document is made based on the generated scores. In some embodiments the label aliases that yield high and/or positive score are identified as being valid aliases for labels corresponding to information of interest.

The determination module 1117 is configured to determine, based on the generated scores of multiple labels, if one or more label aliases (e.g., label aliases a customer is looking for on the document) is present in the portion of the document being processed. Thus in some embodiments the determination module 1117 is configured to determine if a first label alias and a second label alias are present in a first portion of the document.

The data extraction module 1118 is configured to extract information of interest corresponding to one or more labels aliases from one or more document portions being processed. For example when the determination module 1117 module determines that a first label alias is present in a first portion of the document, the data extraction module 1118 extracts the information of interest, e.g., data, corresponding to the first label alias from the document portion. The extracted information of interest 1130 is the output of the data extraction module 1118 and includes extracted data corresponding to one or more label aliases for which information is sought.

The auto filling module 1120 is configured to populate, e.g., automatically fill, a field on a document corresponding to a label with which an identified label alias is associated, with the extracted information corresponding to the label alias. Thus the auto filling module 1120 controls auto filling operation to populate fields corresponding to labels and/or label aliases with the extracted information of interest on documents.

Input data, e.g., scanned document, 1122 includes at least a first scanned document to be processed for identifying labels and/or label aliases and extracting information of interest. The document 1123 is generated after the scanned document 1122 is subject to OCR operation.

Training data 1124 includes information used for training the system to process one or more documents in accordance with the invention. In some embodiments the training data 1124 includes objects and object sequences linked to one another in a defined manner. In various embodiments the training data 1124 is used to generate a nodal structure or spider matrix in accordance with the features of invention.

Label and label alias association information 1128 includes information, on a per customer basis, associating various labels with corresponding set of label aliases. Label and label alias association information 1128 includes association information corresponding to multiple customers/clients including label and label alias association information for customer 1 1132, . . . , customer N 1134. The label and label alias association information for customer 1 1132 includes information associating a plurality of labels with a corresponding to set of label aliases as defined by the customer/client, i.e., the information regarding the labels and their associated aliases is known to and provided by the customer 1. In some embodiments the label and label alias association information 1132 further includes information indicating the location of information of interest corresponding to each label alias. The location information indicating where the "information of interest" to be extracted corresponding to each label alias is expected to be located in a document. The location of the information of interest may be different for each label alias. This association can be appreciated from FIG. 7 example which shows one exemplary set of label and label alias association information with location information also being indicated. The label and label alias association information for customer N 1134 includes similar information for customer N, e.g., information associating a plurality of labels with a corresponding to set of label aliases as defined by the customer N and the location of information of interest.

In some embodiments, one or more of the various modules discussed above work in coordination, e.g., with operations being merged to perform a function, to produce a desired output in accordance with the exemplary methods of the invention.

An exemplary method of obtaining information of interest from a binarized document, comprises: storing information associating a first plurality of different label aliases with a first label for first information of interest; storing in a nodal structure, information representing an expected relationship between objects of a first label alias in said plurality of different label aliases, individual objects of said first label alias being linked in said nodal structure to other objects, each of the linked objects being a character or character string, individual links in said nodal structure having a probability associated with the individual link; scoring a first portion of the binarized document against said nodal structure to determine scores for multiple label aliases; determining based on said generated scores if said first label alias is present in said first portion of the binarized document; and in response to determining that said first label alias is present in said first portion of the binarized document, extracting information from the first portion document corresponding to said first label alias.

An exemplary apparatus for use in obtaining information of interest from a binarized document, comprising: memory including a stored nodal structure including information representing expected relationships between objects of a first label alias in a plurality of different label aliases, individual objects of said first label alias being linked in said nodal structure to other objects, each of the linked objects being a character or character string, individual links in said nodal structure having a probability associated with the individual link; and a processor configured to: score a first portion of the binarized document against said nodal structure to determine scores for multiple label aliases; determine based on said generated scores if said first label alias is present in said first portion of the binarized document; and extract, in response to determining that said first label alias is present in said first portion of the binarized document, information from the first portion document corresponding to said first label alias.

In some embodiments the memory further includes stored information associating a first plurality of different label aliases with the first label for first information of interest, and the processor is further configured to: populate a field on a form corresponding to said first label with the extracted information corresponding to said first label alias.

In some embodiments the processor is further configured to: determine based on said generated scores if a second label alias is present in said first portion of the binarized document; and extract, in response to determining that said second label alias is present in said first portion of the binarized document, information from the first portion of the binarized document corresponding to said second label alias. In some embodiments the processor is further configured to populate a field on a form corresponding to said first label with the extracted information corresponding to said second label alias.

The techniques of various embodiments may be implemented using software, hardware and/or a combination of software and hardware. Various embodiments are directed to apparatus, e.g., an image processing device or system. Various embodiments are also directed to methods, e.g., a method of generating bi-level pixel values from a set of input pixel values corresponding to an image. Various embodiments are also directed to machine, e.g., computer, readable medium, e.g., ROM, RAM, CDs, hard discs, etc., which include machine readable instructions for controlling a machine to implement one or more steps of a method.

In various embodiments apparatus described herein are implemented using one or more modules to perform the steps corresponding to one or more methods. Thus, in some embodiments various features are implemented using modules. Such modules may be implemented using software, hardware or a combination of software and hardware. In some embodiments in which the modules are implemented in hardware, the modules are implemented as circuits, e.g., of a processor. In many or all of the above described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above described methods. Accordingly, among other things, various embodiments are directed to a computer readable medium including computer executable instructions for causing a machine, e.g., processor or computer system, to perform one or more of the steps of the above-described method(s).

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., an image processing device or system. In some embodiments the image processing device is a portable device including a camera, e.g., a cell phone including a camera with a processor that implements the method.

In some embodiments modules are implemented using software, in other embodiments modules are implemented in hardware, in still other embodiments the modules are implemented using a combination of hardware and/or software.

Numerous additional variations on the methods and apparatus of the various embodiments described above will be apparent to those skilled in the art in view of the above description. Such variations are to be considered within the scope of the invention.

What is claimed is:

1. A method of obtaining information of interest from a binarized document, the method comprising:
   storing information associating a plurality of different label aliases with a first label for first information of interest;
   storing in a nodal structure, information representing an expected relationship between objects of a first label alias in said plurality of different label aliases, individual objects of said first label alias being linked in said nodal structure to other objects, each of the linked objects being a character or character string, individual links in said nodal structure having a probability associated with the individual link;
   scoring a first portion of the binarized document against said nodal structure to determine scores for multiple label aliases;
   determining based on said generated scores if said first label alias is present in said first portion of the binarized document; and
   in response to determining that said first label alias is present in said first portion of the binarized document, extracting information from the first portion document corresponding to said first label alias.

2. The method of claim 1, further comprising:
   populating a field on a form corresponding to said first label with the extracted information corresponding to said first label alias.

3. The method of claim 1, further comprising:
   determining based on said generated scores if a second label alias is present in said first portion of the binarized document; and
   in response to determining that said second label alias is present in said first portion of the binarized document, extracting information from the first portion of the binarized document corresponding to said second label alias.

4. The method of claim 3, further comprising:
   populating a field on a form corresponding to said first label with the extracted information corresponding to said second label alias.

5. The method of claim 1, wherein the links in said nodal structure correspond to candidate object sequences.

6. The method of claim 5, wherein directions are associated with said links, links entering an object forming a link to a preceding object which may occur in a candidate object sequence, links leaving an object forming a link to a subsequent object which may follow an object in a candidate object sequence.

7. The method of claim 6, wherein a probability associated with a link is one of at least 3 distinct values.

8. The method of claim 7, wherein said three distinct values include a positive value, a zero value and a negative value.

9. The method of claim 8, wherein said negative value is associated with a link to an object which if present is to result in a probability score which will preclude recognition of a label alias corresponding to the negative probability value.

10. An apparatus for use in obtaining information of interest from a binarized document, comprising:
   memory including a stored nodal structure including information representing expected relationships between objects of a first label alias in a plurality of different label aliases, individual objects of said first label alias being linked in said nodal structure to other objects, each of the linked objects being a character or character string, individual links in said nodal structure having a probability associated with the individual link; and
   a processor configured to:
   score a first portion of the binarized document against said nodal structure to determine scores for multiple label aliases;
   determine based on said generated scores if said first label alias is present in said first portion of the binarized document; and
   extract, in response to determining that said first label alias is present in said first portion of the binarized document, information from the first portion document corresponding to said first label alias.

11. The apparatus of claim 10,
wherein said memory further includes stored information associating said plurality of different label aliases with a first label for first information of interest; and
wherein said processor is further configured to:
populate a field on a form corresponding to said first label with the extracted information corresponding to said first label alias.

12. The apparatus of claim 10, wherein said processor is further configured to:
determine based on said generated scores if a second label alias is present in said first portion of the binarized document; and
extract, in response to determining that said second label alias is present in said first portion of the binarized document, information from the first portion of the binarized document corresponding to said second label alias.

13. The apparatus of claim 12, wherein said processor is further configured to:
populate a field on a form corresponding to said first label with the extracted information corresponding to said second label alias.

14. The apparatus of claim 10, wherein said generated nodal structure is stored in said memory.

15. The apparatus of claim 10, wherein the links in said nodal structure correspond to candidate object sequences.

16. The apparatus of claim 15, wherein directions are associated with said links, links entering an object forming a link to a preceding object which may occur in a candidate object sequence, links leaving an object forming a link to a subsequent object which may follow an object in a candidate object sequence.

17. The apparatus of claim 16, wherein the probability associated with a link is one of at least 3 distinct values.

18. The apparatus of claim 17, wherein said three distinct values include a positive value, a zero value and a negative value.

19. A non-transitory computer readable medium for use in an apparatus, the non-transitory computer readable medium including a stored nodal structure including information representing expected relationships between objects of a first label alias in a plurality of different label aliases, individual objects of said first label alias being linked in said nodal structure to other objects, each of the linked objects being a character or character string, individual links in said nodal structure having a probability associated with the individual link, and instructions which when executed by a processor cause said processor to:
score a first portion of a binarized document against said nodal structure to determine scores for multiple label aliases;
determine based on said generated scores if said first label alias is present in said first portion of the binarized document; and
extract, in response to determining that said first label alias is present in said first portion of the binarized document, information from the first portion document corresponding to said first label alias.

* * * * *